Figure 1:
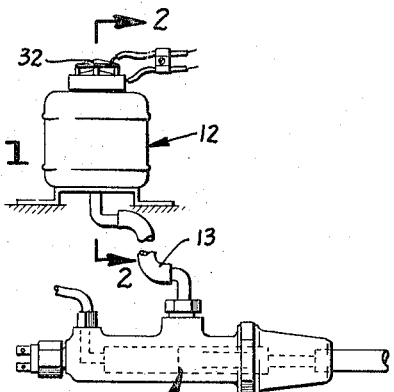

Jan. 3, 1967 R. I. STIWARD 3,296,396
HYDRAULIC BRAKE SYSTEM WITH IMPROVED FILLER CAP
Filed May 24, 1965

INVENTOR.
R. INGVAR STIWARD
BY
Schapp & Hatch
ATTORNEYS

United States Patent Office 3,296,396
Patented Jan. 3, 1967

3,296,396
HYDRAULIC BRAKE SYSTEM WITH IMPROVED
FILLER CAP
Rune Ingvar Stiward, 598 Maureen Lane,
Pleasant Hill, Calif. 94523
Filed May 24, 1965, Ser. No. 458,003
7 Claims. (Cl. 200—84)

The present invention relates to a hydraulic brake system, and more particularly to a hydraulic brake system having an improved vent system which positively assures venting communication between the brake reservoir and the open atmosphere.

Recently, with the advent of high-speed driving under heavy traffic conditions, people have become more and more dependent upon the operation of their brake systems, and it is no exaggeration to say that peoples' very lives depend upon the proper function of their hydraulic brakes. Accordingly, any brake failure which results in rapid or sudden loss of brakes can be fatal, not only to the occupants of the car in which the failure occurs, but also to other people in the vicinity.

One of the causes of series brake failure is the complete plugging of the vent for the fluid supply reservoir, which provides fluid to the master cylinder. When this vent is plugged up, an inadequate supply of fluid to the master brake cylinder results, with a resulting impairment of complete loss of brakes. When this occurs, the driver generally believes the fault to be in the master brake cylinder and brings the car in for such servicing. However, I have found that when car owners bring their cars in with this complaint, quite often the vent system is plugged up so completely that the brake fluid does not flow properly into the master cylinder. This plugging occurs because the cylinder is generally equipped with a small hole through the filler plug to provide venting and this hole is exposed to the open.

In order to illustrate the effect of plugging the vent, a discussion of the operation of the brake is in order. During braking, when the brake pedal is compressed and released, brake fluid flows in front of the master cylinder faster than it returns from the brake line by means of conventional valving, so that on a second stroke following shortly after the first, the brakes may be "pumped up" and sufficient braking will take place on one or more strokes. Of course, the brake system is designed so that under optimum conditions, one brake stroke is sufficient and the required "pumping up" is not necessary. However, some leakage or loss of fluid always does occur sooner or later, and if the vent is kept closed, a vacuum will build up in the reservoir. This means, then, that an inadequate supply of brake fluid is soon provided in front of the master cylinder and that on pumping very little additional fluid is provided. Accordingly, the brake cannot be pumped up. This condition is very serious and should not be tolerated.

In addition, when the vent gets plugged up, it is found that the partial vacuum which is formed within the brake system tends to cause air to leak in through the master and wheel cylinders and cause a "spongy" pedal. Generally, the problem is first noticed in the morning when the brake fluid has contracted because of cooling, and it is necessary to pump up the brakes.

Another serious condition which often occurs is due to insufficient brake fluid caused by leakage or other conditions so that the driver suddenly finds himself with no brakes or inadequate brakes because of insufficient fluid in the reservoir and master cylinder. In the usual operation, this is prevented by having the service man check the brake reservoir from time to time and supply additional fluid as needed. However, in order to check the brake fluid, the service man must remove the filler cap, and frequent removal of the cap increases the possibility for dirt entering the system. Dirt, of course, can also cause serious problems within the brake cylinder. In addition, the service man often will remove the filler plug with greasy hands and frequently this simple check may result in the service man inadvertently filling the vent hole with grease.

Therefore, it is a primary object of the present invention to provide an improved venting system for hydraulic brakes, which venting system is preferably associated with the filler cap in accordance with conventional practice.

In general, the present invention solves the foregoing problems by the use of a movable member extending through a vent with the desired air passage between the movable member and the walls of the vent. This movable member is preferably operated by means of a float which is adapted to fit in the brake fluid within the reservoir. The float causes the member to move up and down by virtue of the geyser effect obtained within the reservoir as the brake pedal is operated. In this way, positive mechanical motion or abrasion will assure keeping the vent passage open at all times. In addition, the vent system is provided with means for protecting the opening from dust and water, and may contain auxiliary vents similar to those now in use, if desired.

Another object of the invention is to provide simple means for inspecting the brake cylinder so that the condition of the fluid therein may be checked without opening or removing the filler cap.

This object is achieved by special construction of the vent of this invention in which a cover or the like is provided at the top of the stem so that the service man may check the position of the float from the outside. The position of the float will, of course, positively indicate the presence of a sufficient fluid level therein. In addition, the invention contemplates the use of switch members on the float-actuated movable member together with the stationary members on the reservoir so that a signal may be provided from the switch to indicate a change of level of fluid in the reservoir.

A further object of the invention is to provide an improved hydraulic brake system of the character described which is simple in construction and absolutely reliable in operation.

A still further object of the invention is to provide an improved filler cap containing an improved venting system suitable for use on hydraulic brakes so that existing hydraulic brake systems may be converted to incorporate the improvement of the present invention without modification thereof.

Still another object of the invention is to provide an improved vent system for hydraulic brakes of the character described in which special precautions are provided to prevent loss of fluid and to keep dirt and other foreign matter out of the system.

Further objects and advantages of the invention will be apparent as the specification progresses, and the new and useful features of the hydraulic brake system will be fully defined in the claims attached hereto.

Figure 2:
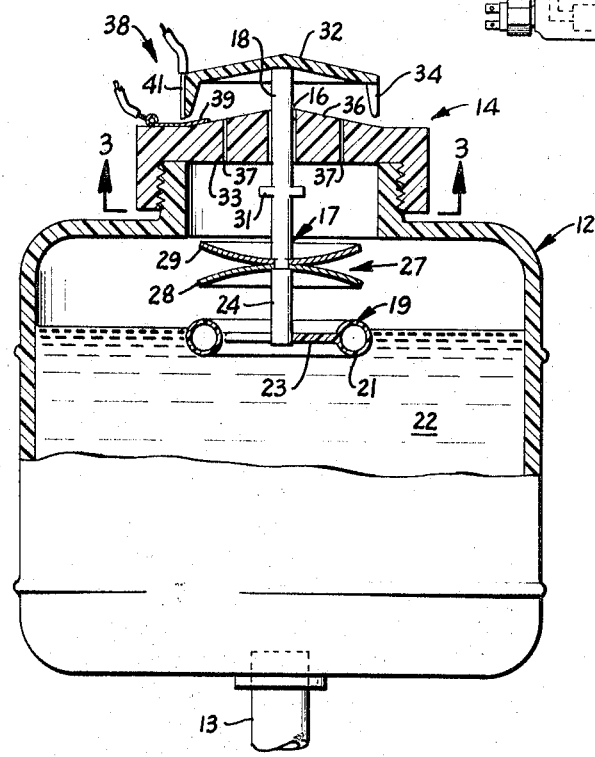
Figure 4:
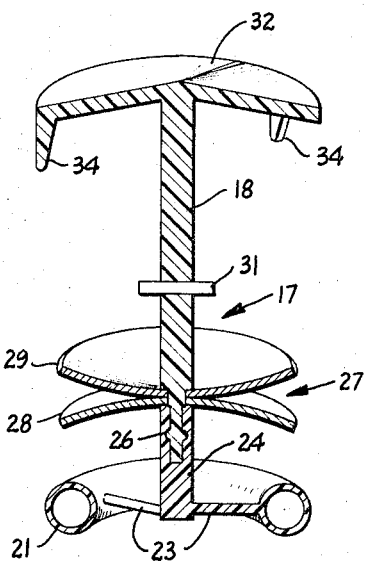
Figure 3:
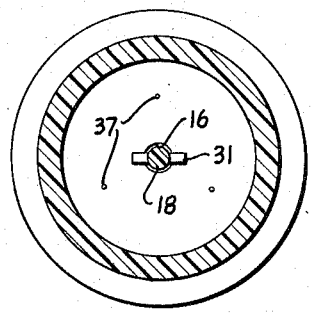

The preferred form of the invention is illustrated in the accompanying drawing, in which:

FIGURE 1 is a diagrammatic view showing a typical master cylinder for a hydraulic brake being equipped with a conventional reservoir for holding brake fluid which is to be supplied to the master cylinder as needed;

FIGURE 2, an enlarged sectional view taken substantially in the plane of line 2—2 of FIGURE 1, and illustrating an improved vent system constructed according to the invention;

FIGURE 3, a section through the device, taken substantially in the plane of line 3—3 of FIGURE 2; and FIGURE 4, an enlarged view illustrating in detail the movable member utilized in the improved vent of the brake system illustrated in FIGURES 1 through 4.

While I have shown the preferred form of my invention, it should be understood that various changes and modifications may be made within the scope of the claims hereto attached without departing from the spirit of the invention.

Referring to the drawings in greater detail, there is shown a brake master cylinder 11 having a reservoir 12 operably associated therewith with fluid communication being provided through passage 13. Although the reservoir is shown as a separate container from the master cylinder, it should be understood that the reservoir may be constructed integrally with the master cylinder and simply be a chamber located directly above and in contact with the master cylinder. Accordingly, the invention is not to be limited to any particular type of hydraulic brake system, but only to a hydraulic brake system containing a master cylinder and reservoir for supplying fluid thereto.

Although it is possible to provide a vent anywhere in the reservoir above the normal liquid level of fluid therein, I prefer to provide my improved vent system in the filler cap thereof in accordance with the usual procedure for venting brake cylinders. However, it should be understood that my improved vent system could be constructed within the housing of the reservoir, if desired.

Thus, as illustrated in the drawings, there is shown a closure 14 or a filler cap which is constructed in accordance with the present invention. This filler cap comprises walls defining an opening 16 extending through the closure device, a movable member 17 containing a stem 18 telescoped through said opening and easily movable with respect to said opening, and means 19 operatively associated with the brake system for imparting relative motion to the stem whereby the opening 16 is kept open through mechanical abrasion. Thus as best seen in FIGURE 2, the opening 16 is larger in cross-section than the stem 18 to provide vent means through the opening while the stem is telescoped therethrough. Although both openings are shown as being circular in cross-section it will be appreciated that other configurations could be used if desired, the important thing being to provide for a vented opening together with the mechanical movement that assures the function of the opening as a breather.

Preferably the means 19 for imparting relative motion to the stem is in the form of a float 21 adapted to be buoyed upward by the fluid 22 in the reservoir 12. Preferably, the float 21 is securely attached to the stem 18 and may be considered as a part of the movable member 17, if desired. As here shown, the float 21 is connected through spoke 23 to a hub section 24 which is equipped to snap over the stem 18 and be held securely in place by the enlarged gripper 26 (see FIGURE 4).

By building the member in two sections that may be telescoped together, the protective device 27 is held securely in place. This protective device contains a pair of concave or disc-shaped elements 28 and 29 with the element 28 serving as a splash shield and the element 29 serving as a dirt catch. The movable member is also constructed with a stop means 31 for limiting the upward travel of the movable member and preventing it from raising the cover 32 an inordinate height above the breathing vents. This stop may be in the form of a cross-bar as best shown in FIGURE 3 or any other suitable form which will abut the bottom surface 33 of closure 14 without blocking the passage 16. If desired, this member and the length of the movable member 17 may be made adjustable to accommodate different sizes of closures.

At the top of the movable member 17, a cover 32 is provided which may be fastened to the stem or cast integrally therewith. However, some provision should be made for assembly so that when the cover 32 is cast integrally with the stem, the stop 31 should be assembled later or an additional sleeve provided for assembly of stop 31 as is shown for assembly of the protective device 27.

The cover 32 is used primarily to protect the vent system against dust and dirt from getting into the opening 16 and from excessive handling. As here shown, the cover is equipped with three or more depending legs 34 so that air communication may take place from the area under the cover to the atmosphere. If desired, instead of the legs 34, a flange in the form of a skirt could be provided, but such a flange should contain a plurality of breather holes. Other variations will be apparent to those skilled in the art, but I prefer to utilize the leg structure as shown since the up and down motion of the cover will prevent any serious confinement of the chamber therein. For this reason, I prefer to provide a conical upper surface 36 or a boss on the closure 14 so that any water or other material that might flow under the cap will not accumulate, but instead will tend to drain away. By the same token, I prefer to provide a similar construction for the cover 32 so that water will drain around and away from the ventilating opening.

In operation, it will be seen that the closure cap will provide the movable member in the position shown in FIGURE 2 with some floatation of the stem occurring when the reservoir is filled to a normal depth. When the brake is operated, the fluid level is lowered and this allows a movable member 17 to lower and the stem 18 to slide in its opening 16. Upon release of the brake pedal, a sudden surge of fluid back into the reservoir takes place and this surge tends to form a geyser of fluid within the reservoir. The geyser slaps against the splash shield 28 and tends to raise the movable member. In addition, the return of fluid buoys up the float 21. In one or both of these ways, the movable member is forced upward until it reaches the extreme upper position allowed by stop means 31. After a period of time the fluid will become quiescent and the movable member settles back into its normal position.

Thus it is seem, that on operation of the brake pedal, considerable mechanical activity is provided at the vent and that complete clogging of the vent is positively avoided. In addition, the closure may contain two or three small vents 37, if desired. These vents are of very small diameter and similar to the vents heretofore used. It is seen that these auxiliary vents are also protected by the cover 32 and cannot be inadvertently filled with grease by the mechanic's hand. Since they are drilled in a hard cap, they do not become closed by swelling as is the case in certain vents where rubber baffles are used that have vents drilled therethrough. Excessive vent openings should be avoided to keep evaporative losses of brake fluid to a minimum.

Although the particular materials used in fabricating parts are not critical, it is preferred to use metal or plastic and peferrably the closure is either metal or a hard plastic such as Bakelite. As here shown, the movable member and cover are designed to be made from plastic and designed to go with plastic closures now in use in certain brake systems such as the Volkswagen. However, it will be appreciated that various closures may be modified to suit various reservoirs and that the invention is of universal application for brake reservoirs.

It will also be noted that the vent system of this invention also serves as a gauge. That is, the cover 32 will be in a floating position when the reservoir is full and the service man need only push this member down and watch it bob back up through floatation to determine that sufficient fluid is present in the cylinder. If desired, the upper surface of this cover may be painted red so that it can easily be found.

In addition to this visual gauge, a typical dashboard gauge may be provided by utilizing a switch 38 containing a stationary contact 39 on the closure and a movable contact 41 on the movable member. In this way, a signal is provided to indicate the open and closed position of the switch which corresponds to an up or down position of the float. With this construction, it is seen that the switch may actuate a red signal light (not shown) located on the instrument panel of the dashboard or other suitable place. This switch will be on, and the light will be on, when the movable member is in the lower position due to insufficient fluid. This warning light then will indicate to the driver that he should have more fluid added to his brake reservoir. In addition, he will be alerted that the brakes need servicing if he finds that addition of brake fluid is frequently required.

From the foregoing description, it is seen that I have provided an improved vent system for hydraulic brakes and that my improved vent system is capable of increasing the safety factor in hydraulic brakes and capable of installation on brakes now in use.

I claim:

1. In a hydraulic brake system including a master cylinder and a reservoir for supplying brake fluid to the master cylinder, in combination, a closure device on the upper part of the reservoir comprising a cap having walls defining an opening extending through the closure device, a movable member having a stem telescoped through said opening and easily movable with respect to said opening, said opening being larger in cross-section than said stem to provide vent means through the opening while the stem is telescoped therethrough, a cover mounted on the upper end of the stem, said cover being disposed outside the cap and being in the general form of a roof over said opening to protect said opening from entry of dust and other foreign matter, said cover having means for maintaining open sides under the cover to permit breathing between said opening and the outside atmosphere, and float means carried on the lower end of said stem in operative position to be actuated by change in the level of the brake fluid carried in the reservoir during operation of the hydraulic brake.

2. In a hydraulic brake system including a master cylinder and a reservoir for supplying brake fluid to the master cylinder, in combination, a closure device on the upper part of the reservoir comprising a cap having walls defining an opening extending through the closure device, a movable member having a stem telescoped through said opening and easily movable with respect to said opening, said opening being larger in cross-section than said stem to provide vent means through the opening while the stem is telescoped therethrough, a cover member attached to said stem and movable vertically with said stem as the stem moves axially through said opening, said cover member being disposed outside of the cap and containing a depending leg means capable of resting on said cap in a manner permitting breathing between said opening and the outside atmosphere, a stop member carried on said stem for restricting movement of the stem member whereby the stop member restricts the upward movement of the stem while the cover restricts downward movement of the stem, said stop member being constructed to abut the lower surface of the cap while retaining communication between the opening and the interior of the reservoir, and float means carried on the lower end of said stem in operative position to be actuated by change in the level of the brake fluid carried in the reservoir during operation of the hydraulic brake.

3. The hydraulic brake system defined in claim 2, in which a switch contact is provided on the movable member, and a corresponding switch contact is provided on the cap whereby a signal may be provided through operation of the switch to indicate the condition of the stem and thereby indicate the need for additional fluid.

4. In a hydraulic brake system including a master cylinder and a reservoir for supplying brake fluid to the master cylinder, in combination, a closure device on the reservoir comprising a cap having walls defining an opening extending through the closure device, a movable member having a stem telescoped through said opening and easily movable with respect to said opening, said opening being larger in cross-section than said stem to provide vent means through the opening while the stem is telescoped therethrough, a cover member attached to said stem and movable vertically with said stem as the stem moves axially through said opening, said cover member containing a depending leg means capable of resting on said closure in a manner permitting breathing between said opening and the outside atmosphere, a stop member carried on said stem for restricting movement of the stem member whereby the stop member restricts the movement of the stem in one direction while the cover restricts movement of the stem in the other direction, said stop member being constructed with a dimension smaller than the opening whereby contact of the stop member with the lower surface of the cap retains communication between said opening and the internal area of the reservoir, a protective device on said stem in position below the stop means for providing a splash shield to protect the opening from splashing fluid, and float means carried on the lower end of said stem in operative position to be actuated by change in the level of the brake fluid carried in the reservoir during operation of the hydraulic brake.

5. The hydraulic brake system defined in claim 4, in which auxiliary vents are provided through the cap with the external openings of the vents all being under the cover.

6. The hydraulic brake system defined in claim 4, in which the cap has a raised upper surface with the opening terminating at the highest part of this surface.

7. The hydraulic brake system defined in claim 6, in which a switch contact is provided on the movable member, and a corresponding switch contact is provided on the cap whereby a signal may be provided through operation of the switch to indicate the condition of the stem and thereby indicate the need for additional fluid.

References Cited by the Examiner

UNITED STATES PATENTS

| 2,494,802 | 1/1950 | Fox | 200—84 |
| 2,684,414 | 7/1954 | Kilpatrick | 200—84 |

BERNARD A. GILHEANY, *Primary Examiner.*

H. A. LEWITTER, *Assistant Examiner.*